(12) United States Patent
Sneed

(10) Patent No.: US 6,236,992 B1
(45) Date of Patent: May 22, 2001

(54) SERIAL ENCRYPTION SYSTEM-BYPASS OF YEAR 2000 DATE MALFUNCTIONS

(76) Inventor: Anthony Sneed, 2058 North Mills Ave., Claremont, CA (US) 91711

( * ) Notice: Subject to any disclaimer, the term of this patent is extended or adjusted under 35 U.S.C. 154(b) by 0 days.

(21) Appl. No.: 09/073,258

(22) Filed: May 4, 1998

(51) Int. Cl.$^7$ ................................................. G06F 17/30
(52) U.S. Cl. .............................. 707/6; 707/101; 395/705
(58) Field of Search ........................ 707/6, 101; 395/705

(56) References Cited

U.S. PATENT DOCUMENTS

| | | | |
|---|---|---|---|
| 5,600,836 | 2/1997 | Alter | 395/612 |
| 5,630,118 | 5/1997 | Shaughnessy | 395/601 |
| 5,668,989 | 9/1997 | Mao | 395/612 |
| 5,740,442 * | 4/1998 | Cox et al. | 707/4 |
| 5,758,336 * | 5/1998 | Brady | 707/6 |
| 5,758,346 * | 5/1998 | Baird | 707/101 |
| 5,956,817 * | 9/1999 | Nicholas | 395/701 |
| 6,064,817 * | 5/2000 | Carter et al. | 395/705 |

* cited by examiner

*Primary Examiner*—Wayne Amsbury
(74) *Attorney, Agent, or Firm*—J. Nicholas Gross

(57) ABSTRACT

An improved computing system is described which eliminates potential errors associated with Year 2000 malfunctions. This system may be a retrofitted version of an existing computer system which has been intentionally date regressed to function in a time zone that eliminates potential date computation problems. To effectuate a complete regression of such system, existing databases are date regressed, existing programs are time synchronized with such databases, and existing I/O routines are modified to assure date arithmetic integrity. To handle years outside of a 100 year span, chronological encapsulation is used to set up year specific databases which interact with associated time synchronized copies of any main programs on such system. Multiple regressed states can be implemented in such system by a series of one or more regressed databases and associated synchronized programs, so that date computations can be handled for date data fields spanning across two or three centuries worth of data using only two digit decimal field formats for records.

44 Claims, 4 Drawing Sheets

SERIAL ENCRYPTION SYSTEM-BYPASS OF YEAR 2000 DATE MALFUNCTIONS

FIELD OF THE INVENTION

The invention relates to a computer system that utilizes regressed internal date representations. To effectuate such a system, a unique encoding/decoding mechanism is used for regressing data in typical stored-program computers and their associated databases.

The invention is especially useful for preventing what are commonly known in the art as "Year 2000" malfunctions in computer systems. Because it does not require restructuring or expanding the field widths for data already stored in such systems, and does not require significant modifications of existing programs associated with such systems, the present invention provides a cost effective solution to the pervasive Year 2000 problem.

BACKGROUND OF THE INVENTION

Since 1900, and for census purposes shortly before, the year portion of calendar dates has been truncated to two digits ("55" instead of "1955," for example). The precedence helped maximize the amount of information encoded on 80-column punch cards in use throughout the first half of the 20th century. Such cards were indispensable for the decennial census (1890, 1900, 1910, 1920, 1930, 1940), significantly speeding census counts and post-census count analysis. Without such punch card technology, according to the U.S. government, the 1890 census would not have been completed before the 1900 census began. The machines that processed the cards were called tabulators, later having plug-in boards that could be wired to perform various computational and printed report functions. The same technology gained wide-scale commercial acceptance in business (in addition to census applications) after 1913, maintaining the same two-digit census precedence for the year portion of dates.

By the 1950's, electronic computers began replacing tabulators to support census and commercial data processing. Data storage advances included magnetic tape (herein mag tape") and electromagnetic disk drives (herein "disk drives"). Vast amounts of data originally stored on punch cards were transferred to the new media of mag tape and disk drives. These new storage devices added the ability to randomly and electronically access files through stored program machines, a dramatic improvement over the manual handling of millions of punch cards. The new storage technology also used less physical space to store data than punch cards, as well as obviating much of the labor expense to manually process punch card-based data files.

The two-digit precedence for year portions of calendar dates (instead of four digits) was also used with the newer electronic computers and their storage devices. This simplified the transfer of volumes of punch card data while avoiding additional expense to store four-digit year fields. In doing so, the punch card images were transferred unaltered to the new storage devices, speeding conversion and removing up to an additional 2.5% storage-expense per record. Thus, the two-digit year precedence helped save space and reduce costs when converting to newer storage technology at mid-century. Such technology enabled database files to be accessed randomly instead of only sequentially.

To have done otherwise, such as converting to four-digit years, may have inflated the already high cost of newer storage offerings as compared to punch card technology and its media. No manufacturers desired to include in a product proposal a 2.5% higher cost, which might give competitors an instant 2.5% price advantage who stayed with two digit years already on punch cards. Thus, the remedy (of staying with two digit years) was technologically expedient and helped reduce a price objection by customers, mating the storage devices appear as seamless extensions of proven punch card protocols. This expediency, and its widespread perpetuation during the last four decades, helped set the worldwide conditions for the Year 2000 Malfunction.

None of the computing technology advances since then have reversed the long-term effects of maintaining the two-digit year precedence. Though the cost of disk drive storage has dropped dramatically in the last few decades, the reprogramming expense to reverse out the two-digit date limitation has reciprocally increased each year. New functions were incrementally added to existing programs decade after decade. Such software changes were stimulated by regulatory requirements, new tax reporting and accounting methods, corporate acquisitions, new telecommunications links between multiple computer sites, new hardware and other reasons.

With each and every change, the two-digit year precedence spread like yeast within a batch of dough. Every year, it seemed easier to justify avoiding radical changes to production software that had taken years to develop and stabilize. Leaving software the same as it was the year before, even if the hardware was changed, seemed operationally and fiscally prudent. In numerous cases, this reasoning was followed until the Year 2000 Malfunction began to tangibly manifest itself in economically damaging ways over the past 18 to 24 months.

Current solutions to retroactively address the Year 2000 Malfunction involve restructuring such databases, and rewriting support programs to accommodate full four digit representations of calendar years instead of two digit abbreviations. This reengineering task involves multiple billions of lines of code, and multiple trillions of bytes of data spread throughout government, academic and private sector databases. All of this is running on a host of different computing platforms built during the last 40 years, some of which may no longer be commercially produced, if the manufacturers remain in business at all. Also, due to age, some of the source code for programs in many production systems may no longer be available.

Conventional tools to address the Year 2000 Malfunction may not produce useful results sooner than 18 to 36 months. In many cases, this may make a plethora of systems that electronically handle multiple trillions of dollars of resources--including airline reservations, banking transactions, accounting systems, utilities, government tax collections, social services, and others—inoperable as the frequency of Year 2000 Malfunctions increases.

A more promising and useful solution to the above malfunction has been proposed and described in a prior art U.S. Pat. No. 5,600,836 to Alter. In the Alter implementation, a computing system is configured to operate in "zone" time, which time is different from an external "local" time. The "zone" time is intentionally set at some multiple of four years (preferably 56 years to preserve leap year and day of the week integrity) in the past. In this way, the system perceives that it is operating at a time some 56 years in the past, and therefore, a date operation involving years 2002 and 1985, for example a subtraction operation, is treated as an operation involving years 1946 and 1929 instead. In other words, a conventional un-treated computing system limited to two digit date fields would treat the subtraction operation as 02–85 (the truncated values of 2002 and 1985) and give an erroneous result of –83, but the Alter approach yields the correct result of 46–29=17. By confining the computing system to operate with date field values within a single century, any internal date operations are kept accurate (in a relative sense). To maintain consistency with the outside world, an interface is used in Alter for converting date field data to local or zone time.

Some limitations of the Alter approach, however, include the fact that there is no mechanism for handling databases that include date field data exceeding 100 years in scope. For example, as of 1994 at least, the social security database includes data for birth years for more than 117 years worth of individuals. This cannot be accommodated even in a system modified by Alter, as such is still limited to a single two-digit database structure. Moreover, Alter apparently fails to appreciate that the number of computer programs that can be kept on a system utilizing such approach is limited unless such programs are also "synchronized" with the time adjusted data in such system.

SUMMARY OF THE INVENTION

Accordingly, it is an objective of this invention to provide a method for eliminating potential Year 2000 malfunctions from existing computing systems that include programs and/or databases limited to two-digit date formats;

A related objective of the present invention to provide an improved computing system that, while only utilizing programs and/or databases limited to two-digit date formats, can nevertheless perform date calculations spanning across two different centuries without error by operating in a regressed state;

A related objective of this invention is to provide a method for conditioning the date data used in such systems so as to make such data usable in a regressed state computing system;

A further related objective of the present invention is to effect an interface for use with a regressed data computing system, so that date field data passed to and from such system is encoded and decoded as necessary to synchronize it with the regressed state of such system or an actual time existing outside of such system.

These and other objects are effectuated by providing a computing system which has been converted to operate in one or more time regressed states. To place such system into such state, a first method of the present invention encodes date fields of records in a data file B so that such records can be used in a computer system during a calendar year YY, where YY represents a value of the last two decimal digits of a year between 2000 and 2099. An offset value, or encryption key, g, is used to transform such data file B to an encoded data file B' by modifying the data values in each of the records of B by said offset g when XX–g>=0 so that XX is replaced with XX–g for each such record in B. When XX–g<0, the record is removed from the first data file, and stored in one or more sub-data files $B_s'$. In this manner, the date fields of both B' and $B_s'$ are configured such that date computation integrity involving XX and YY is maintained in the computer system irrespective of the value of YY. In one implementation of this first embodiment, sub-data file $B_s'$ is comprised of a plurality of sub-databases $B_1'$, $B_2'$, $B_3'$ . . . $B_n'$, and each such sub-file contains records for a single year. The records of such computing system are preferably examined in advance so that the value of g is selected to minimize the number of sub-data files. Using such approach, data files B' and Bs' may contain data for records spanning more than 100 years. In another implementation of this first embodiment, a first regressed database B' may be created to contain records for a first 100 year time span, and a second regressed database B" may be generated to contain records beyond this 100 year time span.

A method is also provided herein for converting software code of a computer program, so that such program can be used in a computer system that is limited to two digit decimal representations of dates. This is accomplished by first identifying any portions of the software code in such program that include either and/or both (i) a computation involving the date field from data file B and any associated date field related computation constant C; and/or (ii) a system clock call. These portions are then modified, if necessary, by replacing any date field related computation constant C, or system call, with a shifted computation based on g. This process is repeated until all of the software code for such program has been converted, and results in a computer program converted to perform date computation operations involving date values ranging from approximately 1900+g to 2000+g. In addition, the software code can be configured so that a first sub-program operates with date field data from a first 100 year time span, and a second sub sub-program operates with date field data beyond said first 100 year time span.

In a third process described herein, suitable adjustments are then made to input and output portions of software code so that date computation integrity is maintained as date field data is passed to and from such date regressed system.

In this way, a computer system can be configured to operate now and beyond the year 2000 without experiencing date operation malfunctions caused by processing date across more than one century. This is a result of the fact that any original data files B are converted into encoded data files B' based on the desired offset g, and all associated programs are synchronized with such files.

In yet another embodiment, date operations associated with the programs and said data files can be executed by such system using a first regressed time T1, and/or a second regressed time T2, where T2 is different from T1. This further facilitates a complete conversion of an existing system, and permits date operations to be performed with date values spanning even more than 200 years.

Thus, the arithmetic encryption and re-engineering tools of the invention encode both databases and programs to make such entities compatible with a time regressed computing system, using a unique interface to synchronize information exchanges between peripheral devices and the central processor in a computing complex. A series of two encoder and two decoder protocols are applied to both databases and programs to encrypt the internal date representations of a computing system while maintaining synchrony with extant calendar precedence for computation, external transfer, display or printing of date-sensitive information.

The invention therefore provides a solution for retrofitting any manner of computing hardware and storage technology subject to the Year 2000 Malfunction. It achieves this without altering the two-digit year precedence of existing databases, and with only minor parametric changes to software supporting such databases. The simplicity of this encryption and re-engineering invention allows the Year 2000 Malfunction to be addressed in a matter of weeks, instead of months or years for most systems. This may permit a large number of organizations to obviate the malfunction in as little as seven weeks, and probably no more than seven months for even the most complex systems. The invention enables each organization to address the malfunction with existing staff, avoiding the expense and uncertainty of trying to find and hire specialized consultants as the supply of such personnel continues to shrink. As such, this invention helps increase the useful life by 20 to 80 years of already-purchased systems through in-place staff.

When applied, the invention herein is a direct replacement for additional hardware storage devices and additional central computers that may otherwise be needed and purchased in mass to allow large-scale information systems to be modified and operate beyond the year 1999. In this sense, the encryption and re-engineering invention acts as a direct substitute for tangible and costly hardware-intensive alternatives now being considered to avoid the Year 2000 Malfunction.

DETAILED DESCRIPTION OF THE INVENTION

Figure 1:
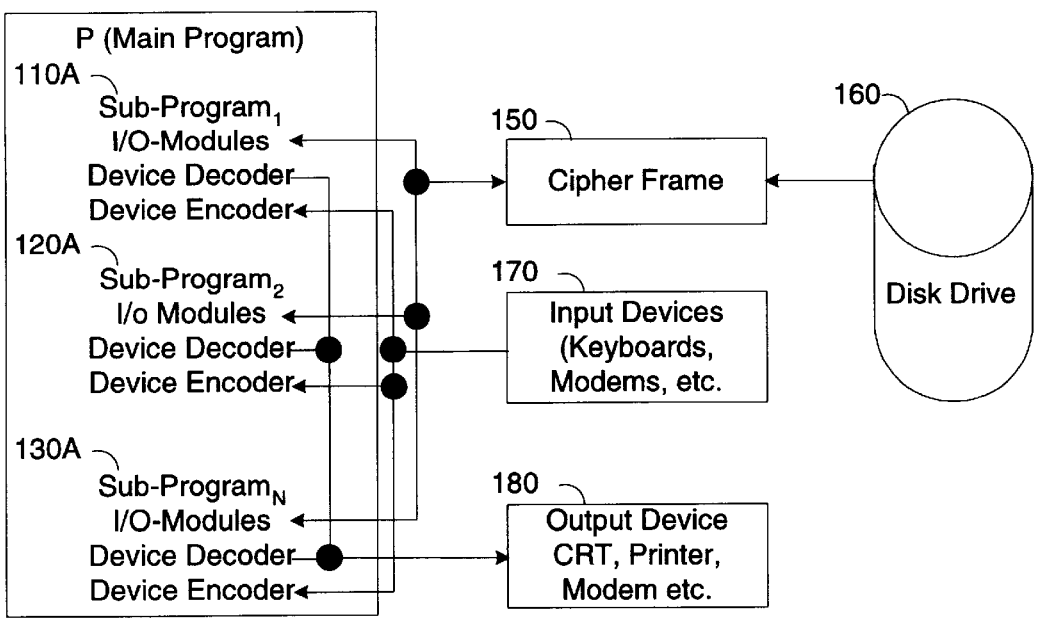
FIG. 1 is a high level block diagram of the overall structure of a computing system embodying the teachings of the present invention.

The invention herein is related to the potential Year 2000 Malfunction which exists for large-scale, and widely used computer systems. This particular malfunction is generally isolated to systems programmed to use two digits to represent years in calendar dates. For example, such systems abbreviate "1955" to "55." Because of this, calculations involving dates beyond the year 1999 cause system malfunctions from programs that maintain a two digit precedence to represent years throughout their programs and database files. In such systems, "00" represents the year "2000" since only two decimal digits (DD) are used to record the year (say XX) in a calendar date. Computations that use a value of "00" to denote the year 2000 violate the chronological sequence of actual calendar dates ( . . . , 97, 98, 99, 00, 01, . . . ). The truncation, therefore, makes 2009 chronologically less than the two-digit representations of "1901" to "1999," which distorts any time relationships for events, calculations or stored dates projecting beyond 1999.

The serial encryption system of the present invention can be used to efficiently and cost effectively retrofit any two-digit year based date field computing system. Such existing computing systems represent an investment of millions of man hours embodied in multiple billions of lines of code and multiple trillions of bytes of databases developed over the last four decades through a host of computer languages, hardware platforms and storage technologies. The invention permits the rapid re-engineering and proto-typing of large-scale and generally used computer systems such that their operation and date integrity is unaffected by the Year 2000 Malfunction.

As such, the encryption system of the present invention is a replacement for costly conventional strategies for dealing with the Y2K problem. These solutions generally require significant man hour expenditures and/or processor hardware and additional storage investments, because they require review and modification of multiple billions of lines of code and multiple trillions of bytes stored on large-scale and generally used computer systems.

The invention herein essentially neutralizes the Year 2000 problem by ensuring that a two digit date field computer system is never permitted to process date data that could lead to erroneous operations. The present invention, in essence, ensures that errors do not occur by ensuring that conditions that could lead to such errors are eliminated. This is accomplished by artificially regressing such computer system (including any associated programs and time-sensitive data within any data files) to a known state that existed g years ago. In this case, g is an offset value in years, and is preferably an integer multiple of four which is used as the encryption key for the Processor Encoder, Disk Encoder, Device Decoder and Device Encoder. As used herein, the regressed state of a logical entity within a computing system is generally designated with a 'notation, so that a regressed program P is designated P', a regressed database B is designated B', etc. created by the Processor Encoder design through manual or automatic means.

It will be apparent to those skilled in the art that from the perspective of such computing system, the internal "regressed" date is of little importance. The only critical consideration is that the relative relationship between two original four digit dates (i.e., in the form DDDD) must be maintained when such original dates are translated into a two digit representation (i.e., in the form DD). In other words, if the actual years involved in a date operation are 2012 and 1980, these would be represented as 12 and 80 in a two-digit date field computing system. Nevertheless, such system must ensure that mathematical operations involving these truncated numbers are accurate. It is evidence, nevertheless, that this is not possible without some intervention because the simple operation of subtraction involving these dates (which should yield a result of +32) will instead yield a value of −68. Accordingly, some translation must be performed on the original four digit dates to ensure that any mathematical operations yield the correct result. When such values in the two digit fields are to be used outside of such system, a re-translation must occur to harmonize such internal regressed values with their real time values.

Figure 2:
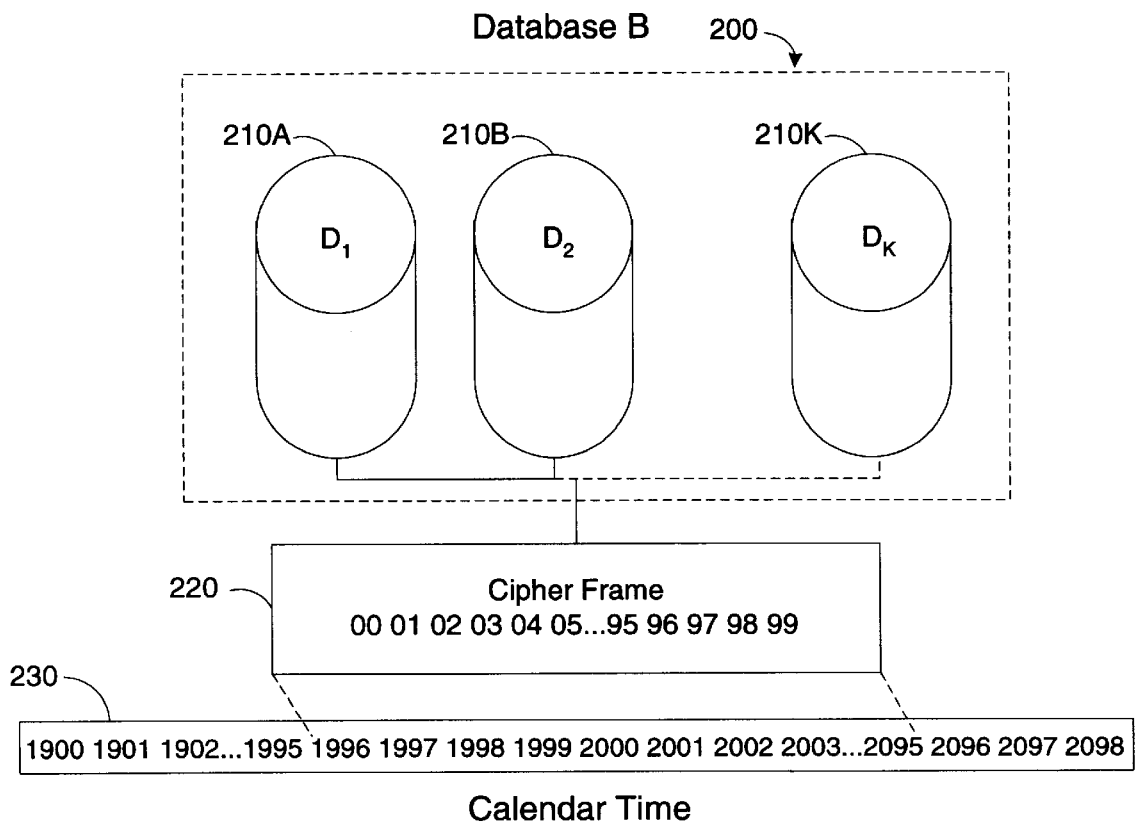
FIG. 2 is a block diagram illustrating the operation of a Cipher Frame interface of the present invention, which coordinates and maintains date consistency between an internal regressed database, and other non-regressed, real-time entities.

In FIG. 1, a preferred embodiment of a computing system 100 embodying the teachings of the present invention is illustrated. Such system includes one or more original main software programs P' that have been modified (as explained further below), and any number of sub-programs $P_1, P_2 \ldots P_N$, which are generated as explained below. The latter sub-programs in turn include one or more main software routines that implicate date operations, one or more associated I/O modules, a device encoding interface, and a device decoding interface. A Cipher Frame 150 acts as an interface between encoded dates of a database B' which may be stored on a single disk drive 160 (or one or more disk drives $D_1$, $D_2, \ldots D_K$ as shown in FIG. 2) and internal computations done within the central processor by any of the programs or sub-programs. As alluded to earlier, this interface permits all year-specific fields on database B' to remain as two digit data fields—i.e., in a form DD where DD contains data XX from a truncated value of an arbitrary date XXXX. From a mathematical perspective, therefore, sequential arithmetic symbols, instead of actual dates, are used to represent any input date value. Thereafter, these symbols are used by the computing system for any and all date operations to ensure date operation integrity. It is only when a specific symbol in the Cipher Frame is decoded (as shown in FIG. 2) through a Device Decoder that the symbol gains actual calendar and time meaning for the outside world.

A Device Decoder interface for each program P' or sub-program $P_n$ converts encrypted-symbols to years before output or transfer to other devices or systems 180. It can be seen that if for some reason a single output module or section of code does not decode an encrypted symbol before output, then the fail-safe mode of the encryption system only results in a worst case example of a "regressed" year being printed or displayed. A regressed-year-dated check of more than a year or two, for example, is usually non-negotiable. This appears to be an advantage the encryption system has over other methods that require database restructuring and reprogramming of massive amounts of code.

Completing the input/output translation between actual time in the outside world and regressed time within computing system 100 is a Device Encoder interface; again, a separate interface is used for each program P' or sub-program $P_n$ as explained further below. Such interface converts actual year input data into encrypted-symbols. As this entry mechanism into the system is fairly controllable (i.e., date field data in input data is usually well identified), the probability of an erroneous mistranslation is acceptably small.

In FIG. 2 it can be seen that Cipher Frame interface 250 coordinates and maintains date consistency by synchronizing the interchange of data between a computing system and its associated storage and I/O devices. In a preferred embodiment, Cipher Frame interface 250 includes 100 symbols ("00" to "99") which are purposely detached from any specific group of years. Instead, these symbols operate as logical one-to-one mapping entities between actual calendar time date values and internal regressed data values. These symbols are related to actual calendar years through an offset value g, which value for g can be specified by a system administrator for such computing system based on various considerations explained further below. An integer multiple of four is preferably used for g, and such value operates to arithmetically encrypt the Cipher Frame interface to represent a specific, contiguous 100 year period, as needed. It can be seen that this period can span and overlap across two different centuries worth of data, thus eliminating the potential errors associated with using actual calendar year values. Cipher Frame interface 250 therefore can be aligned to the specific requirements of any particular computing system, and can be serially aligned (i.e., in multiple "regressions" of the same system) to span across multiple 100 year periods including any period that may trigger the Year 2000 Malfunction. As an example, it is conceivable that an optimal value g for a computing system may vary between g1 at calendar time T1, and g2 at T2. Cipher Frame Interface 250 is thus flexible enough that it may be altered from time to time according to changing system demands.

The table below explains the correlation between a selected value of g, and the actual calendar years that are then mapped by Cipher Frame interface 250:

| g Value | Database Encoded Years through Cipher Frame interface |
|---------|-------------------------------------------------------|
| 0       | 1900–1999                                             |
| 4       | 1904–2003                                             |
| .       | .                                                     |
| .       | .                                                     |
| .       | .                                                     |
| 92      | 1992–2091                                             |
| 96      | 1996–2095                                             |
| etc.    |                                                       |

In virtually every date-aware program, there is a routine that computes the length of time between dates, usually in days. So long as the base-date used in these calculations is below the lowest calendar date encrypted through the Cipher Frame interface, all relative time lengths so computed will be chronologically consistent for internal interim computations.

In the present invention, therefore, as the dates are outputted from an encrypted computer system, they are made to appear externally consistent with "today's" date. Yet, internally the machine thinks it's "1977," if g=20, and if today's date is in the year 1997 for example. The invention maintains all relative time lengths (between internally encrypted dates) which ensures the chronological integrity of subsequent computations for any year encoded.

Figure 3:
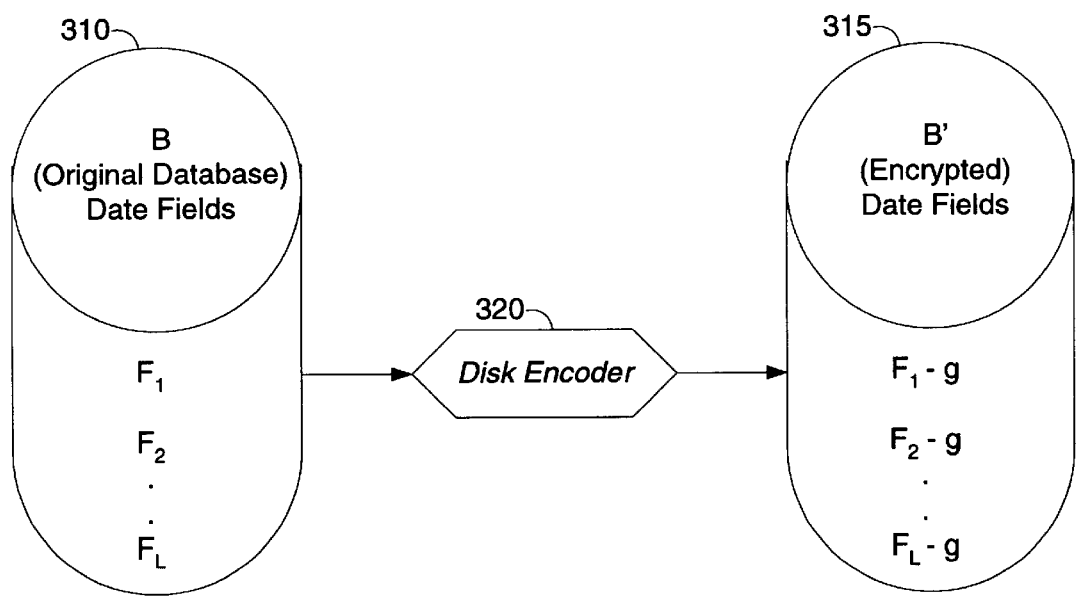
FIG. 3 illustrates the general operation of a Disk Encoder of the present invention as it is used to convert an existing, two digit date field database B, into an encrypted, date regressed database B'.

In FIG. 3, the transformation of a preexisting set of data files B into regressed data files B' is explained through the operation of Disk Encoder 320. In sum, Disk Encoder 320 takes all or part of the data image of any database B 310 on a disk drive (D) and encrypts all year-specific fields through the selected Cipher Frame interface 250 (which contains 100 two-digit symbols ("00" to "99") to generate a new regressed state database B' 315. Disk Encoder 320 allows Cipher Frame 250 to be recursively encrypted, if needed, in subsequent years, as proscribed by a value g, an integer multiple of four selected for the DiskEncoder. Again, if g=0, Cipher Frame Interface 250 encompasses calendar years 1900 to 1999, the default for virtually all systems, based on the historical 2-digit year precedence used during the 20th century.

Disk Encoder 320 is preferably executed as part of an overall retrofitting or conversion of a preexisting computing system that is being modified in accordance with the teachings of the present invention to become Year 2000 malfunction-free. Nevertheless, it is conceivable that such operation may need to take place at a later time as well, or that other types of computing systems using another Year 2000 solution may benefit from using time-regressed date data. For example, it may be necessary at a later time to upgrade the computing system to a full four field date field data format, and the reverse operations would then need to be made to construct such new database from the two field data formats of B'. In this regard, therefore, Disk Encoder 320 can be executed essentially at any time, and provides a very simple mechanism for accomplishing such functions.

In operation, Disk Encoder 320 is a simple software routine that merely subtracts g from every two-digit year-specific field $F_L$ of database B 310 on the disk drive (or drives). This encodes database B 310 through the Cipher Frame interface, making it the encoded database B' 315 having transformed data $F_L-g$ for each date field. A corresponding encryption through Processor Encoder 410 (see FIG. 4 explained below) ensures that any program P that alters or uses database B' in any way whatsoever recognizes and correctly interfaces to database B through Cipher Frame 250.

The year 2000 is a regular leap year (unlike the years 1900 and 2100, since these centennial years do not have a February 29th), based on the quadricennial adjustment initiated in 1582 for most of Europe (1752 for England and its possessions) to correct an error in Julius Caesar's reckoning of the length of a year in 46 B.C. The fact that g is an integer multiple of four ensures consistency with quadrennial (leap) years that a Cipher Frame interface may span. With 2000 being a regular leap year, Cipher Frame 250 may transparently encompass it as well. Those skilled in the art will recognize that if y is an encrypted symbol for a year within Cipher Frame interface 250, and if g=20 for example, then y+g+1900 is the full four-digit calendar year encoded within y.

Finally, Disk Encoder 320 also detects year dates in B that can not be encoded through Cipher Frame interface 250. For such records Disk Encoder 320 preferably produces a series of year-specific sub databases $B_1, B_2, \ldots B_x$ for each year that is outside the Cipher Frame interface. For example, if g=20, and assuming original database B 310 spanned a period from 1880 to 2019, then a series of new databases $B_{1919}, B_{1920}, B_{1880}$ can contain all records outside of Cipher Frame 250. In this way, actual calendar years 1920 to 2019 are encoded within Cipher Frame interface 250, and records with actual calendar dates in this range remain encoded within B'315.

This approach works extremely well because according to U.S. census data as of 1994, less than 5% of all demographic data will lie outside of a Cipher Frame interface 250 spanning actual calendar years 1920 to 2019. The number of exceptions handling, therefore, will be limited to a small number in the specially coded databases $B_{1919}, B_{1920} \ldots B_{1880}$. It can be seen, nevertheless, that the present invention in fact provides the capability to maintain date data spanning across three centuries' worth of data using only two digit date field formats, unlike prior art techniques that are limited to two centuries worth of date field data. This is accomplished, essentially, by including more than one regressed state of data within the computing system.

In another embodiment, records outside of the 100 year span of Cipher Frame interface 250 can be stored in a second (even more) regressed database B" where B" complements B' by the fact that it is intentionally displaced by another constant (in a preferred embodiment, exactly 100 years—one century) from regressed database B'. In other words, records within B" are offset by a value of g+g'; where g'=100, in all likelihood, all of the records within B will be mapped to either B' or B." As an example, if regressed database B' contains calendar year data for 1920–2019, B" can be set to include calendar year date data for years 1820–1919. This method, in fact, essentially effectuates a second Cipher Frame interface 250', which is used for handling dates beyond that afforded by as single 100 year Cipher Frame interface 250. The only required modification, in this instance, is that operations involving B" by P" must take into account that this second database has been intentionally regressed even with respect to B' by an additional g' years.

In this manner the present invention can effectuate a computing system with multiple regression states, instead of only one, and this fact, too, eliminates the need for special handling of out of range calendar year data caused by large values of g. As an example, if g is set to 56 (a useful value in some systems since it is both a multiple of 4 and 7 and thus preserves date congruence as well as day of the week congruence), then the actual dates encompassed within B' range from 2055 to 1956, and within B" dates encoded include 1856 to 1955; for all practical purposes, this approach should encapsulate any records of a preexisting database B into at most two regressed databases.

Figure 4:
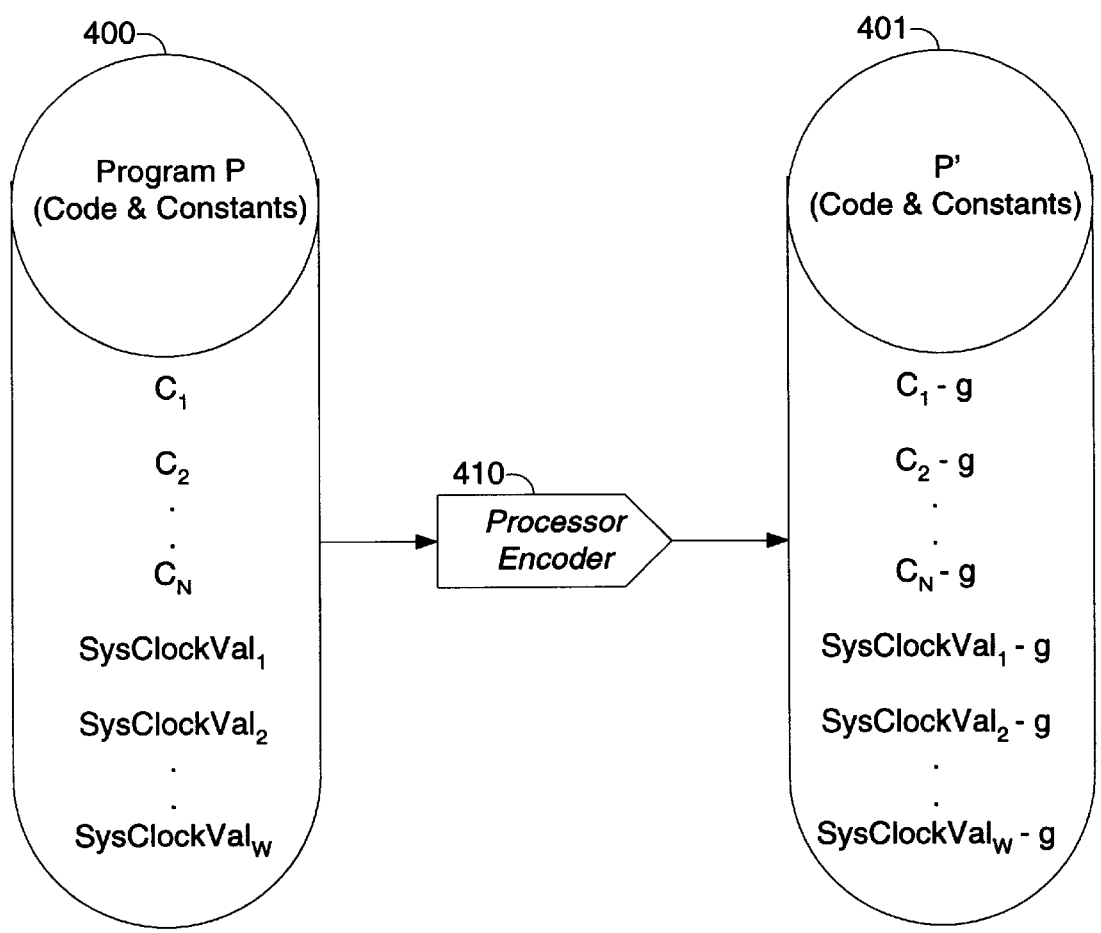
FIG. 4 illustrates the general operation of a Processor Encoder of the present invention as it is used to convert an existing program P, into a date synchronized program P'.

In FIG. 4, a Processor Encoder 410 is another software routine that modifies any program P within computing system 100 that updates or uses any database B' encoded through Disk Encoder 320. Such modified programs P' become chronologically aligned with any database B' through the Cipher Frame interface interface for any date-related computation or any data retrieval of a date-related field. Processor Encoder 320 simply identifies all chronological constants in P and subtracts g therefrom, where g is the same value used by Disk Encoder 320 for database B'. It also subtracts g from the year portion of all system clock values ("SysClockval's") resulting from system clock calls ("SysClockCalls"). A system clock call provides the year, month, day, and hours, minutes and seconds that a computer maintains internally. To ensure that the computing system is kept in a regressed state, therefore, g is subtracted from the year portion of every SysClockVal, before it is transferred to any variable within a program or used for any other type of computation within program P.

Handling of records outside of regressed database B' by programs within computing system 100 can be accomplished as follows. Again, assuming g=20, Cipher Frame interface 250 encompasses the years 1920 to 2019 (represented by Cipher Frame symbols "00" to "99"). If there are records with dates on the main database, B that precede 1920 (representing information 78 years or older relative to 1997), then these records are assigned to sub-databases, $B_{1919}, \ldots B_{1880}$. A worst case involves setting g=20 for a very large database, like the U.S. Social Security database. For this database, 95% of the database in regressed database B' will contain the records of all people 77 years and younger, and only 5% would be spread across $B_{1919} \ldots, B_{1880}$ (1880 is considered the lower limit because in 1997 no known person is over 117 years old).

In a first embodiment, such new regressed databases $B_{1919}, \ldots, B_{1880}$ are handled by corresponding synchronized sub-programs $P_{1919}, \ldots, P_{1880}$. These sub-programs are identical to P (the main program) except that each has fixed date constants programmed into them, unique to their sub-databases' year-specific contents. In this manner, P' along with $P_{1919}, \ldots P_{1880}$, are treated as a single object since 95% to 99% of their code is identical. This part of the encryption architecture supports the few years outside of Cipher Frame interface 250 and is generally referred to herein as chronological encapsulation.

Each program $P_{1919}, \ldots P_{1880}$ is a clone of P with fixed year constants encoded into each clone program for its particular year. When a year outside of Cipher Frame 250 is detected by the Device Encoder 530 (explained below) this latter routine invokes the year-specific $P_T$ to handle whatever data is received with the year. Otherwise, the regular program path within P' handles the data entered along with the year. Each $P_T$ has its own database $B_T$ which is partitioned from B' by Disk Encoder 530 based on each particular year outside of Cipher Frame 250.

The Social Security database is a worst case example, since most databases do not encompass a 117-year span. Yet even with this, for one of the most complex databases in the world, over 95% of the entire database is within Cipher Frame 250, with chronological encapsulation accommodating the remaining 5%.

In addition, in many instances, the number of additional synchronized programs $P_T$ can be kept to a minimum because of the characteristics of the data kept in such databases. For example, in the U.S. Social Security database, individuals born before 1920 are 78 years and older. If all such persons fit a uniform pattern of benefit payments, then $P_{1919} \ldots P_{1880}$ may be identical to each other to the point that they may collapse into a single program, $P_{1919-1880}$. This pattern may be consistent across many private and public sector databases. Again B' would contain the most volatile demographics (77 years and younger), which represents 95% of the entire database population—and it would all be in Cipher Frame interface 250.

In another variation of the present invention, where a single second time regressed database B" is used, a single second program P''' supplements P' in a manner similar to that afforded by programs $P_{1919} \ldots P_{1880}$ described above. Such second program P''' is synchronized so that it operates with second regressed database B"; as with P', this can be accomplished by simply taking into account the additional offset g' in any calculations (i.e., by adding or subtracting it where necessary) in the manner described above. In this manner, a computing system 100 can operate in multiple regressed states simultaneously to accommodate actual calendar year dates spanning across a 200 year contiguous time period, rather than simply 100 years.

As with Disk Encoder 320, Process Encoder 410 is preferably executed as part of an overall retrofitting or conversion of a preexisting computing system that is being modified in accordance with the teachings of the present invention to become Year 2000 malfunction-free. Nevertheless, it is conceivable that such operation may need to take place at a later time as well (for example, new programs may need to be added), or that other types of computing systems using another Year 2000 solution may benefit from using time-regressed programs. In this regard, therefore, Process Encoder 410 can be executed essentially at any time, and provides a very simple mechanism for accomplishing such functions.

Finally, to facilitate handling of situations when operations of P' or some other sub-program implicate records outside of the database associated with such program or sub-program, an interim buffer, called $I_{MAIN}$, can accept database updates or other transactions for database records outside of Cipher Frame interface 250. Such interim buffer, is later sorted into individual files, $I_1$–$I_T$, which are individually applied for updating sub-databases $B_1 \ldots B_T$, through each sub-databases' date-specific program, $P_1 \ldots P_T$.

Even for the most massively complex programs, involving hundreds of thousands of lines of code, there are perhaps fewer than several dozen year-constants pre-programmed for computational and comparison purposes. In source code, such constants may be readily found by doing routine text searches for "00" to "99" values. If only executable code is available, a reverse compiler still forces the dates to standout through identified instructions with constant fields. In either event, the task may be trivial compared to tracing every usage of a two-digit field that needs to be expanded to four digits across multiple billions of lines of code.

The present encryption mechanism requires only minor changes to those few portions of the system that generate time-based values (a small fraction of most software programs, as compared to every instance within a large program that must be altered to accommodate new, four-digit year fields). Encryption only introduces incremental changes to specific parts of a computer's software, as opposed to altering the entire infrastructure of databases and programs. Encryption helps avoid many of the risks inherent in trying massive conversions with limited budgets, tight deadlines and competing priorities of available staff.

After transforming any associated databases into regressed state databases, and synchronizing associated programs, the only remaining step needed to complete the conversion of a preexisting computing system to become Year 2000 malfunction-free is to ensure that any input/output operations are also identified and modified as needed to ensure that date field data passing between the computing system and I/O devices are kept consistent. In other words, the system should process date fields at a regressed time T, where T represents a calendar year which is=YY−g (where YY represents a value of a two-digit truncated portion of a year DDDD), but input/output data should be generated based on the actual calendar year YY.

Figure 5A:
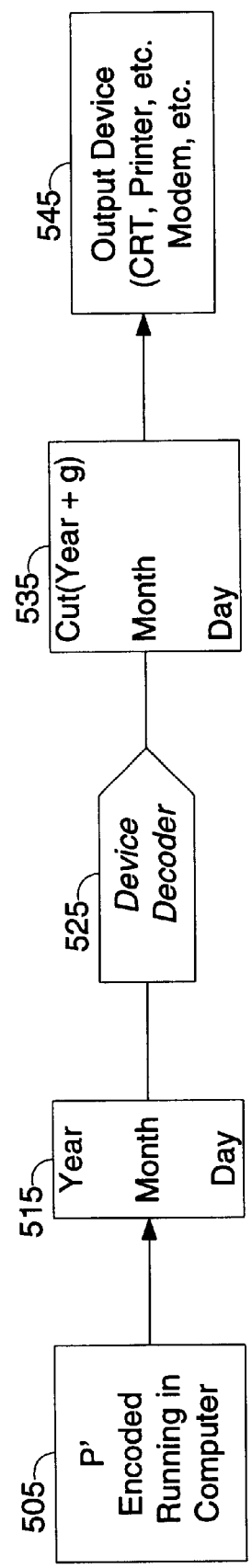
FIG. 5a illustrates generally how a device decoder of the present invention operates to maintain date consistency between date regressed programs P' and output devices as they may exist within a computing system modified in accordance with the teachings of the present invention.
Figure 5B:
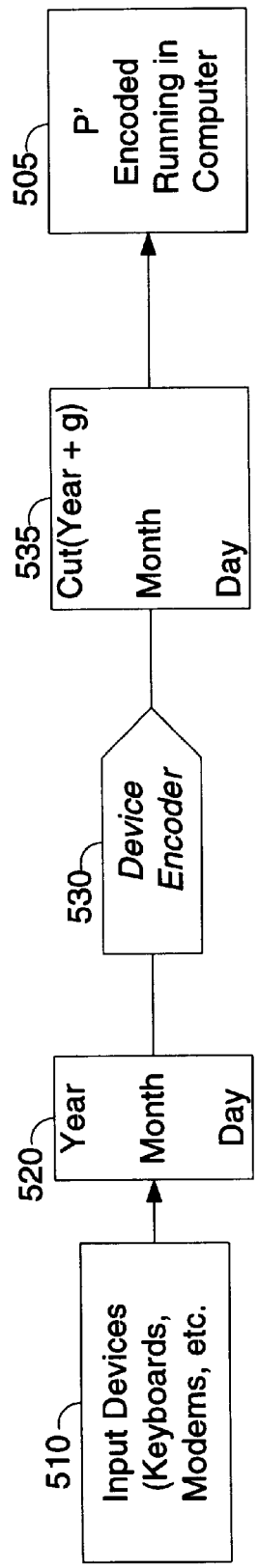
FIG. 5b illustrates generally how a Device Encoder of the present invention operates to maintain date consistency between input devices and date regressed programs P' as they may exist within a computing system modified in accordance with the teachings of the present invention.

Such operations can be achieved readily with Device Decoder 525 illustrated generally in FIG. 5A, and Device Encoder 530 illustrated generally in FIG. 5B. Device Decoder 525 is required before any encoded date may be transmitted for printing, displaying or interchanging with any other device. Device Decoder 525 converts any encoded two-digit symbol received at 515 from Cipher Frame 250 into its two-digit year equivalent. This is done by adding g to the two-digit encoded symbol and truncating the sum to two digits to generate an externally consistent date field 535 before it is provided to an output device 545. As used in this figure, the operation cut(value) truncates a value to its two right-most digits; i.e., cut(112)=12.

In a similar fashion, to maintain consistency with externally provided date data, Device Encoder 530 in FIG. 5B takes any un-encoded four-digit year value 520 received from a keyboard or other device 510, and encodes it through Cipher Frame 250. The encoded value 535 may then be used within any program P' modified by Processor Encoder 410, and any associated database B' 315 encrypted with Disk Encoder 320. After subtracting g, Device Encoder 530 then decides if the four-digit year can be encoded into a two-digit symbol within Cipher Frame 250, or if it represents a year outside of Cipher Frame 250.

As an example, if g=20 then Device Encoder 530 logic is as follows:

If (Year−g >1899) then Year:=cut(Year−g) else begin
Case Year of begin
1919: $P_{1919}$
1918: $P_{1918}$
1917; $P_{1917}$
.
.
.
1882: $P_{1882}$ (if needed)
1881: $P_{1881}$ (if needed)
1880: $P_{1880}$ (if needed)
end Alternatively, as explained above, it is also possible for Device Encoder 530 merely to pass control to a second synchronized main program P''' which is responsible for maintaining date field data for a second regressed database B".

Other Variations of the Present Invention

Serial encryption of Cipher Frame interface 250. The present invention permits an encryption key g where: g=g1+g2+g3 . . . . gn so that each g may be used to encrypt successive, overlapping, 100 year periods through Cipher Frame interface 250, which permits the invention to be used serially This requires complete fidelity with the quadricennial (400 year) precedence m subsequent centennial years (2100, 2200, etc. which do not contain a quadrennial leap day), as it is consistently reflected in the year 2000 (which contain a quadrennial leap-day) for extant programs, systems and databases subject to the Year 2000 Malfunction.

Optional Cipher Frame interface having 256 symbols (0 to 255) to span a period of up to 256 years. An optional 256 symbol Cipher Frame interface 250 can be used in systems that permit redefinition of a two digit decimal field as two concatenated binary fields, each field a minimum of one byte in size. If the fields can be concatenated, then a larger Cipher Frame interface may contain a minimum of 32,768 symbols (0 to 32,767). The decimal representations of years in a database B are then mapped on to sequential symbols in the Cipher Frame interface. Device Encoder 530 and Device Decoder 525 would contain parallel mapping logic for receiving year values and outputting year values, respectively. Processor Encoder 410 can then include a provisions for adjusting all chronological constants and SysClockVals for consistency with encryption through such modified Cipher Frame interface. Disk Encoder 320 would encrypt a database B to map its range of years onto some portion (such as the lower end) of the optional Cipher Frame interface.

The invention reduces the time to re- engineer virtually any large-scale, generally used computer system and its database, compared to extant methods that require two-digit to four-digit conversions of year representations. Restructuring such existing databases holding multiple trillions of bytes of data creates a very dramatic and costly change in the multiple billions of lines of code P supporting such databases. These multiple billions of lines of code have evolved over a four-decade period, across a range of computer architectures and manufacturers, not all of which are still in business.

If the multiple billions of lines of code are looked at as a single software object, then the two-digit to four-digit conversion may be prohibitive to complete, in aggregate, within the next 12 to 36 months. Even if accurate source code were available (which it may not always be for a significant percentage of code in both the private and public sectors), there may remain a shortage of trained programmers and consultants with sufficient expertise to handle the size of the task within available budgets and time.

The present invention simplifies the task by focusing only on an arithmetic encryption that preserves existing software and hardware investments. Disk Encoder 320 can readily encrypt virtually any type of database overnight, without changing the record architecture within a target database. By leaving data structures intact, this helps obviate the huge expense of reprogramming multiple billions of lines of program code.

From the discussion above it is apparent that Cipher Frame Interface 250, as well as Device Decoder Interface 525 and Device Encoder Interface 530, can be implemented in a variety of ways known in the art, including in dedicated hardware, or as independent stand alone routines that run on system 100 and/or as an integrated sections of programs P' and sub-programs P'. Other variations will be apparent to skilled artisans.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the appended claims.

What is claimed is:

1. A method of encoding date fields of records in a database B so that such records can be used in a computer system during a calendar year YY, where YY represents a value of the last two decimal digits of a year between 2000 and 2099, the fields having a format DD and containing data values XX where XX represents a value of the last two decimal digits of a year between 1900 and 1999, the method comprising the steps of:

provide an offset value g, where g is an integer >=4;

transforming the database B to an encoded database B' by modifying the data values in each of the records of B by said offset g when XX−g>=0 so that XX is replaced with XX−g for each such record in B; and when XX−g<0, removing the record from the first data file, and storing said record in a sub-database $B_s'$ without performing date field expansion on said record;

wherein the date fields of both B' and $B_s'$ are configured such that date computation integrity involving XX and YY is maintained in the computer system irrespective of the value of YY; and further wherein said sub-database $B_s'$ is comprised of a plurality of sub-databases $B_1'$, $B_2'$, $B_3'$ . . . $B_n$, where 0<=n<=g, and each such of said plurality of sub-databases contains records for a single year.

2. The method of claim 1, wherein said value of g is selected to minimize the number of sub-databases in sub-database $B_s'$.

3. The method of claim 1, wherein said encoded database B' and sub-database $B_s'$ contain data for records spanning more than 100 years.

4. The method of claim 1, further including a step of adding new records to said encoded database B' by mapping the date value YY of any such records to a value XX', where XX'=100+YY−g.

5. The method of claim 1, wherein said encoded database B' contains data for a first 100 year time span, and sub-database $B_s'$ contains data for a second 100 year time span.

6. A method of encoding date fields of records in a database B so that such records can be used in a computer system during a calendar year YY, where YY represents a value of the last two decimal digits of a year between 2000 and 2099, the fields having a two-digit format DD and a value XX where XX represents a value of the last two decimal digits of a year between 1900 and 1999, the method comprising the steps of:

providing an offset value g, where g is an integer >=4;

converting the database B to a plurality of encoded databases B' based on said offset g; and wherein all of said plurality of encoded databases B' use a two digit format for date fields for records in said files, and taken in combination such plurality of encoded databases B' contain data for records spanning more than 100 years; and further wherein said plurality of encoded databases B' include a main database $B_0'$ spanning up to 100 years of date field data, and a number of sub-databases $B_1'$, $B_2'$, $B_3'$ . . . $B_n$, where 0<=n<=g, and where each such sub-database contains records for a single year such that 100+g years worth of data is contained in such sub-databases in date fields that are not expanded to four digits.

7. The method of claim 6, further including a step of adding new records to the encoded databases B' by mapping the date value YY of any such records to a value XX', where XX'=100+YY−g.

8. A method of converting software code of a computer program, which program is intended to be used in a computer system during a calendar year YY, where YY represents a value of the last two decimal digits of a year between 2000 and 2099, the system also including records in an encrypted database B having date fields with a two digit format DD and a value XX, where XX represents a value of the last two decimal digits of a year between 1900 and 1999, and where the date fields of such encrypted database represent date values shifted by an encryption key g from an actual date, the method comprising the steps of:

(a) identifying any portions of the software code in such program that include either and/or both:
 (i) a computation involving the date field from encrypted database B and any associated date field related computation constant C; and
 (ii) a system clock call;

(b) modifying, if necessary, said portions of software code identified in (a)(i) by replacing said date field related computation constant C with an encrypted computation constant C' where C'=C−g;

(c) modifying, if necessary, said portions of software code identified in (a) (ii) by replacing said system clock call with an encrypted system clock call based on the encryption key g;

(d) repeating steps (a) through (c) until all of the software code for such program has been converted to interact with encrypted database B for records spanning from 1900+g to 2000+g;

(e) providing at least one additional software routine to coordinate date transactions with a sub-database B', which sub-database B' does not use date field expansion and includes date records for a single year Y outside of a range spanned by said encrypted database B;

wherein the computer program is converted to perform date computation operations involving date values ranging from 1900+g to 2000+g, and said additional software routine handle date values for said year Y.

9. The method of claim 8, wherein during step (e) a number of additional software routines are provided to interact with a corresponding number of sub-databases $B_1'$, $B_2'$, $B_3'$ . . . $B_n'$, and each such sub-database contains records for a single year.

10. The method of claim 8 wherein said encrypted database B and sub-database B' contain data for records spanning more than 100 years.

11. A method of configuring a computer system, which system includes one or more programs intended to operate during a calendar year YY, where YY represents a value of the last two decimal digits of a year between 2000 and 2099, and where the programs access records in a database B having two digit date fields with a format DD and a value XX, where XX represents a value of the last two decimal digits of a year between 1900 and 1999, the method comprising the steps of:

(a) providing an offset value g, where g is an integer >=4;
(b) converting the database B to a plurality of encoded databases B' based on said offset g, such that said plurality of encoded databases B' may contain data for records spanning more than 100 years and without performing date field expansion on said records;
(c) synchronizing the programs to operate with said plurality of encoded databases B';

wherein the system is configured to perform date computation operations involving date values spanning across two centuries using said plurality of encoded databases B' and said synchronized programs; and further wherein during step (b), said plurality of encoded data files include a main database $B_0'$ spanning up to 100 years of date field data, and a number of sub-databases $B_1'$, $B_2'$, $B_3'$ . . . $B_n'$, where 0<=n<=g, and where each such sub-database contains records for a single year such that 100+g years worth of data is contained in such sub-databases in non-date expanded form.

12. The method of claim 11, wherein during step (b), the database B is converted to an encoded database B' by modifying the date coded fields XX in each record of B by said offset g when XX−g>=0 so that XX is replaced with XX−g for each such record in B, and when XX−g<0, said record is removed from B and stored in a sub-database $B_s'$.

13. A method of configuring a computer system, which system includes one or more programs intended to operate during a calendar year YY, where YY represents a value of the last two decimal digits of a year between 2000 and 2099, and where the programs access records in a database B having two digit date fields with a format DD and a value XX, where XX represents a value of the last two decimal digits of a year between 1900 and 1999, the method comprising the steps of:

(a) providing an offset value g, where g is an integer >=4;
(b) converting the database B to a plurality of encoded databases B' based on said offset g, such that said databases B' may contain data for records spanning more than 100 years without including any date expanded fields;
(c) synchronizing the programs to operate with said plurality of encoded databases B';

wherein the system is configured to perform date computation operations involving date values spanning across two centuries using said plurality of encoded databases B' and said synchronized programs; and further wherein during step (c) the programs are converted by identifying any portions of the software code in such program that include either and/or both:
 (i) a computation involving the date field from database B and any associated date field related computation constant D; and
 (ii) a system clock call;

(d) modifying, if necessary, said portions of software code by replacing said date field related computation constant D with a shifted computation constant D' where D'=D−g, and, if necessary, replacing said system clock call with a shifted system clock call based on the offset g.

14. The method of claim 11, further including a step (d): converting any input/output programs intended to be used in such system so that input/output data is modified by said offset g when it is passed between said input/output programs and said synchronizing programs.

15. The method of claim 11, further including a step (d): providing an input/output interface for such system for detecting data in date fields in input/output programs and modifying said data by said offset g when such data is to be passed between said input/output programs and said synchronizing programs.

16. The method of claim 15, wherein said input/output interface permits new records to be writtent to database B' by mapping the value YY of any date fields of such records to a regressed value XX', where XX'=YY−g+100.

17. The method of claim 15, wherein said input/output interface permits records to be read from database B' by mapping the regressed value XX' of any date fields of such records to a non-regressed value YY, where YY=XX'+g−100.

18. The method of claim 11, wherein the system is configured so that date operations associated with the programs and said data files are executed by such system at a regressed time T, where T represents a calendar year=YY−g.

19. The method of claim 11, wherein the system is configured without modifying the structure or size of the two digit date field in data file B.

20. The method of claim 11, wherein the system is configured so that date operations associated with the programs and said data files are executed by such system using a first regressed time T1, and/or a second regressed time T2.

21. A computer system that performs data operations on date field values having a two digit form DD, the system including:
an encoded database B' that includes date fields with a two digit form DD and associated year date values XX that are offset by an integer value g from a true value YY, such that XX=YY−g+100; and
at least one encoded sub-database file $B_s'$ that includes date fields with a two digit form DD and associated year date values XX; and
one or more computer programs P time-synchronized to operate with said encoded encoded database B' and encoded sub-database $B_s'$; and
an input/output interface for time-synchronizing data that is passed between said one or more time-synchronized programs P and non-synchronized input/output devices; and
wherein the system is configured to perform date computation operations involving date values spanning across two centuries, and said encoded database B' and encoded sub-database $B_s'$ may contain date values spanning more than 100 years; and
further wherein encoded database B' includes data spanning up to 100 years of date field data, and said at least one encoded sub-database $B_s'$ includes a number of sub-databases $B_1', B_2', B_3' \ldots B_n$, where 0<=n<=g, and where each such sub-database contains records for a single year such that 100+g years worth of data is contained in such sub-databases without including any date-expanded fields.

22. The system of claim 21, wherein programs P are synchronized to said data files so that date operations associated with the programs and said data files are executed by such system at a regressed time T, where T represents a calendar year=YY−g.

23. The system of claim 21, wherein said input/output interface permits new records to be written to data file B' by mapping the value YY of any date fields of such records to a regressed value XX', where XX'=YY−g +100.

24. The system of claim 21, wherein said input/output interface permits records to be read from database B' by mapping the regressed value XX' of any date fields of such records to a non-regressed value YY, where YY =XX'+g−100.

25. The system of claim 21, wherein date operations associated with the programs and said data files are executed by such system at a regressed time T1, and/or a regressed time T2.

26. The system of claim 21, wherein each sub-data file $B_s'$ has an associated time-synchronized computer program $P_s$ for processing data associated with the date values in such sub-data file.

27. A method of operating a computer system for performing data operations on date field values having a two digit form DD, the method including the steps of:
(a) generating encoded values of any date fields of the two-digit form DD used by said system: by shifting an associated year date value YY of said date field by an offset integer value g; and when YY represents a year value between from 1900 to 1999, and YY−g>0, separately encoding said year date value without performing date field expansion;
(b) processing said date fields using said encoded values for YY with one or more programs associated with the computer system and;
wherein the system performs date computation operations involving date values spanning across two centuries, and said data values for YY may contain date values spanning more than 100 years; and
further wherein said encoded values are stored in an encoded database B' with data spanning up to 100 years of date field data, and in at least one or more encoded sub-databases $B_1', B_2', B_3' \ldots B_n$, where 0<=n<=g, and where each such sub-database contains records for a single year such that 100+g years worth of data is contained in such sub-databases without including any date-expanded fields.

28. The method of claim 27 wherein for step (a) said encoded value is set=YY−g+100.

29. A method of operating a computer system for performing data operations on date field values having a two digit form DD, the method including the steps of:
(a) generating encoded values of any date fields of the two-digit form DD used by said system: by shifting an associated year date value YY of said date field by an offset integer value g; and when YY represents a year value between from 1900 to 1999, and YY−g>0, separately encoding said year date value without performing date field expansion;
(b) processing said date fields using said encoded values for YY with one or more programs associated with the computer system and;
wherein the system performs date computation operations involving date values spanning across two centuries, and said data values for YY may contain date values spanning more than 100 years; and
further wherein said encoded values are stored in an encoded database B' with data spanning up to 100 years of date field data, and in at least one or more encoded sub-databases $B_1', B_2', B_3' \ldots B_n$, where 0<=n<=g, and where each such sub-database contains records for a single year such that 100+g years worth of data is contained in such sub-databases without including any date-expanded fields; and
further wherein each said sub-database has an associated time-synchronized computer program for processing data associated with the date values in such sub-database.

30. The method of claim 27, wherein the processing of said date fields is executed by such system at a regressed time T, where T represents a calendar year=YY−g.

31. The method of claim 27, further including a step (c) receiving input date field data external to said system from an input device and then encoding said data in accordance with step (a) before said date field data is processed at step (b).

32. The method of claim 27, further including a step (d) converting said encoded values to external date values before transmitting said values to an output device.

33. The method of claim 27, wherein g is selected to be a multiple of 4.

34. A method of converting input and output date field data having a two-digit format DD, so that such data can be processed by a computer system having encoded date field values shifted by an offset value g, the method including the steps of:

(a) generating encoded values of input date field data, and decoded values of output date field data to be used by said computer system by shifting an associated actual year date value YY of said input/output date field by an offset integer value g so that I/O operations can be performed for records spanning 100 years worth of data from 1900+g to 2000+g by said shifting and without date field expansion; and when YY represents a year value before a year 1900+g, separately encoding said year date value without date field expansion so that I/O operations can be performed for records spanning before said year 1900+g; and wherein the system processes said date fields for records associated with years 1900+g to 2000+g using said offset g, but does not use said offset for records associated with years prior to 1900+g.

35. The method of claim 34, wherein said input field data is provided by an external date file.

36. The method of claim 34, wherein said input field data is provided by an external input device such as a computer terminal.

37. The method of claim 34, wherein said output field is provided to an external output device such as a printer or computer display.

38. A method of operating a computer system during a calendar year YY, where YY represents a value of the last two decimal digits of a year between 2000 and 2099, the system including at least one or more computer programs that access records in a database B having date fields with a two digit format DD and a value XX, where XX represents a time shifted date value which has been shifted by an offset g from an actual date, the method comprising the steps of:

(a) executing any computations involving a data field constant C in the at least one or more computer programs by replacing said date field related constant C with a shifted computation constant C' where C'=C–g; and (b) executing any computations involving a system clock call in the at least one or more computer programs by replacing said system clock call with a shifted system clock call based on the offset g;

wherein said computer system can perform date computation operations involving date values ranging from 1900+g to 2000+g without using expanded date fields.

39. The method of claim 38, including a step (c): executing any I/O operations having data fields in the computer system by shifting said date field by said offset g.

40. The method of claim 39, further including a step (d): adding a new record having a date value YY to a data file B by setting a date field XX=100+YY–g for such record.

41. A method of operating a computer system which includes a main database B having date fields with a two digit form DD, and at least one second database B' also having date fields with a two digit form DD, the method including the steps of:

(a) operating said database B such that its associated date fields contain date values that are intentionally regressed by an offset value g from a true value for said associated date fields, such that database B can contain records with date field values spanning from 1900+g to 2000+g;

(b) operating said second database B' such that its associated date fields contain date values that are not regressed, such that second database B' can contain records with date field values before 1900+g and which records do not include expanded date fields;

wherein said computer system can perform data storage and retrieval operations for data records containing more than 100 years worth of date values, by using records of said database B when a date operation involves a year between 1900+g to 2000+g, and by using records of said second database B' when a date operation involves a year before 1900+g.

42. The method of claim 41, wherein said data file B' includes a number of sub-data files $B_1'$, $B_2'$, $B_3'$ . . . $B_n'$, where 0<=n<=g, and where each such sub-file contains records for a single year.

43. The method of claim 41, wherein I/O operations for a record having a date value 20YY, where YY has a value from 00 to g–1, are handled by shifting said value YY by said offset g, and I/O operations for record having a date value 19XX, where XX has a value from g to 99, are also handled by shifting said value XX by said offset g when XX>g.

44. The method of claim 42, wherein when XX<g, I/O operations for a record having a date value 19XX are not time shifted.

* * * * *